Dec. 6, 1938. T. H. RICHARDS 2,139,420
DIRECTION SIGNAL FOR AUTOMOBILES
Filed March 10, 1937
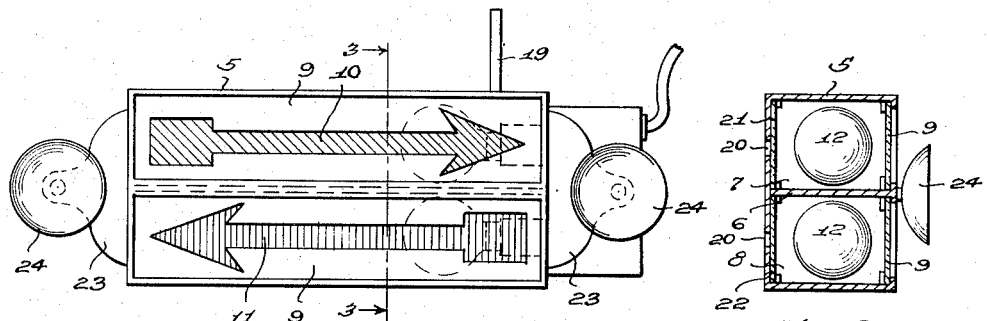
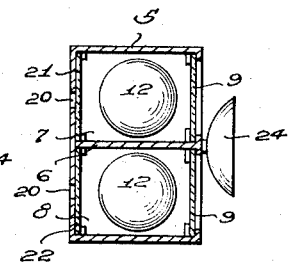
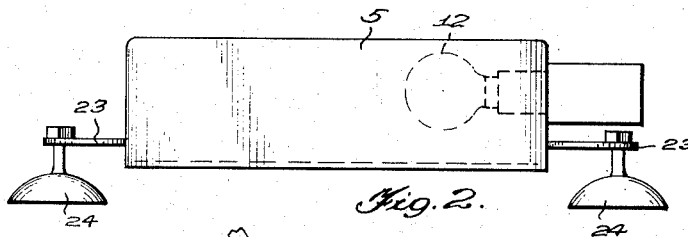
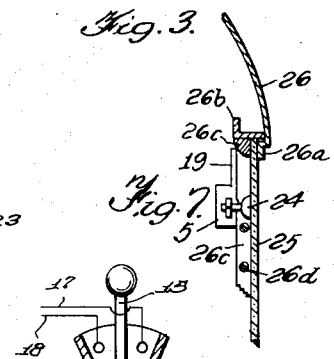
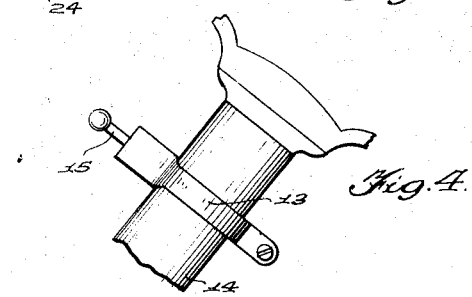
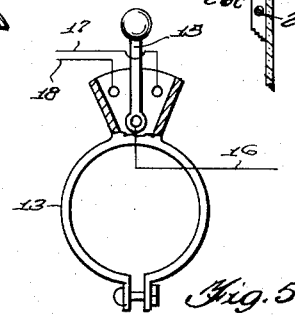
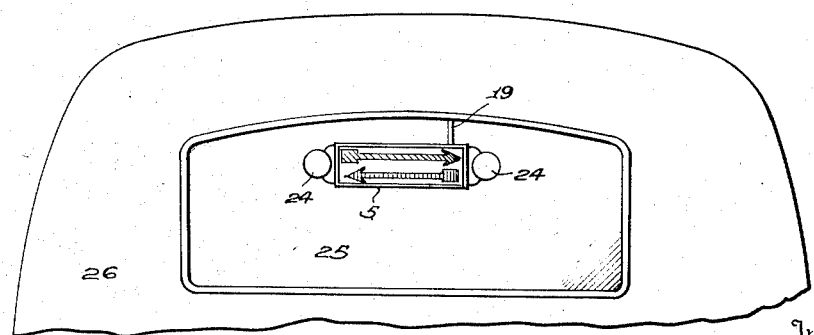
Inventor
T. H. Richards
By Shepherd Campbell
Attorney Patented Dec. 6, 1938

2,139,420

UNITED STATES PATENT OFFICE 2,139,420

DIRECTION SIGNAL FOR AUTOMOBILES

Thomas H. Richards, Coconut Grove, Miami, Fla.

Application March 10, 1937, Serial No. 130,161

1 Claim. (Cl. 177—329)

This invention relates to direction signals for automobiles, and it has for its object to provide a simple and inexpensive device of this nature adapted to be secured to the rear window of an automobile, by virtue of which certain important advantages are achieved, as will be more fully set forth in the detailed description.

In the accompanying drawing:

Figure 1 is a face view of the signal as it would appear to the driver of a following automobile;

Fig. 2 is a plan view of the structure of Fig. 1;

Fig. 3 is a transverse vertical section through the signal;

Fig. 4 is a detail view of a two-way switch, showing the same mounted upon the steering post of an automobile;

Fig. 5 is a view partly in plan and partly in section of the switch of Fig. 4, and Fig. 6 is a view looking toward the rear window of an automobile having the signal applied thereto; and Fig. 7 is a sectional view through the rear window of an automobile with the device of my invention shown in elevation thereon.

Like numerals designate corresponding parts throughout the several figures of the drawing.

The device of the present invention comprises a casing 5, preferably of sheet metal and of any suitable size and shape. In the particular form of the invention chosen for purposes of illustration, the casing is divided by a central horizontal partition 6 into an upper compartment 7 and a lower compartment 8.

An otherwise open side of the casing is covered by a glass pane or panes 9, one of which is provided with a transparent or semi-transparent portion of green glass 10, in the shape of an arrow pointing toward the right, said arrow extending along and forming a part of the side of the upper compartment. The remainder of the upper pane 9 is opaque. It may be of black glass, or the glass around the green arrow may be painted black. In like manner, the lowermost pane 9 is provided with an arrow pointing toward the left, this arrow consisting of red glass 11, the remainder of the lowermost pane 9 being opaque. I shall hereinafter refer to the side of the casing which carries the arrows as the rear side, because it faces toward the rear of the automobile by which the signal is carried.

A lamp 12 is disposed in each of the compartments 7 and 8. A ring-like metal clamp 13, adapted to be clamped upon the steering post 14, carries switch lever 15. A live wire such as a connection from the ammeter of the automobile, indicated at 16, may be attached to the pivot point upon which the switch lever 15 swings, said lever when thrown to the right establishing electrical connection with conductor 17, leading to the lamp of the upper compartment 7.

When lever 15 is thrown to the left, it completes a circuit, in like manner, to the lamp in the lower compartment through conductor 18. Thus, when lever 15 is thrown to the right, the green arrow is illuminated, and when it is thrown to the left, the red arrow is illuminated.

While I have shown only single leads to the respective lamps in a manner common in devices of this sort, it will be understood that it is within the purview of the invention to provide a complete metallic circuit to these lamps by the mere expedient of bringing a ground wire back through the same cable which carries conductors 17 and 18 and grounding this wire upon the steering column.

It is common practice to supply current to electric lamps through a single conductor and through one part of a lamp base, the other part of the lamp base being grounded, and the wiring of Fig. 5 is adapted for such an arrangement.

However, since the device of this invention is intended to be mounted upon the glass rear window of an automobile through the medium of rubber vacuum cups, and since both the rubber cups and the glass of the window are non-conductors of electricity, I may complete the circuit to the lamps either by a return ground wire as suggested, or by providing a ground strip 19 upon the casing 5, which will make contact with the metallic body of the automobile at the window frame. When the device is pressed toward the window in applying the same, the vacuum cups will be compressed. When the device is released, the vacuum cups expand only partially. At this time, the ground strip 19 will be held in cushioned contact with the body of the automobile under the action of the vacuum cups. A well known type of automobile top construction has the metal around the rear window opening inturned as at 26ᵃ to form a flange against which the rear window 25 abuts. A stiffening flange 26ᵇ is welded to flange 26ᵃ and projects inwardly far enough to serve as a frame for the reception of a metallic retaining strip 26ᶜ which is held in place by screws 26ᵈ which take into the flange on frame 26ᵇ. When ground strip 19 touches strip 26ᶜ as shown in Fig. 7, casing 5 is grounded through 26ᶜ and flange 26ᵇ to the body 26.

By referring to Fig. 3, it will be seen that I have provided sight openings 20 in that wall of the casing opposite the wall which carries the arrows, and I cover these openings with small pieces of green and red glass, indicated at 21 and 22. I shall hereinafter refer to this wall as the front wall, because it faces toward the front of the automobile.

Ears 23 carry vacuum cups 24 by which the signal may be mounted upon the inner face of the rear window 25 of an automobile 26 and at a point so high that it will not interfere with the driver's view of the road behind, in his rear vision mirror, not shown. This locating of the direction signal in the position described has several important advantages in that:

First, the signal is mounted in a position where it may be more easily seen by the driver of a car in the rear thereof;

Second, it is mounted in a position where it will be protected from the weather and especially from mud and snow, and Third, it is mounted in such position that the driver of the automobile to which it is applied can always determine whether his signal is operating properly by noting the spots of light showing at the openings 20. If the red and green lights show through these openings, he can be assured that the lamps have not burned out and that the signal is in proper working order.

One of the most serious objections to direction signals applied in the vicinity of the tail light is that in rainy weather, the splashing of mud upon the signals quickly covers their supposedly transparent surfaces to such an extent that it is not possible to determine what they are intended to show. It will readily be understood that a splotch of mud at the pointed end of an arrow could easily destroy the appearance of the arrow, and in fact, make this element appear to be pointing the wrong way.

I am aware of the fact that it has heretofore been proposed to provide direction signals embodying transparent arrows intended to be illuminated to indicate the direction of turn. However, this broad thought is so old as to be public property, and I now propose to provide a new and better locating and mounting of a signal of this sort, in such fashion as to avoid the objections of the older signals, arising from their exposure to the weather, mud, snow and the like, and to achieve the other advantages hereinbefore recited.

The invention is not to be limited to the precise construction set forth, but it includes within its purview whatever changes fairly come within either the terms or the spirit of the appended claim.

Having described my invention, what I claim is:

A device of the character described comprising a casing, a lamp in said casing, rubber vacuum cups carried by the casing for supporting said casing directly upon the glass of the window of an automobile, and a contact element carried by said casing and held in contact with the metal of the automobile at the edge of the window by the action of said vacuum cups.

THOMAS H. RICHARDS.